United States Patent [19]
Freiday

[11] 3,765,377
[45] Oct. 16, 1973

[54] AIR POLLUTION CONTROL SYSTEM FOR CHEMICAL RECOVERY UNIT

[75] Inventor: Jay Horl Freiday, West Hartford, Conn.

[73] Assignee: Combustion Engineering, Inc., Windsor, Conn.

[22] Filed: June 23, 1972

[21] Appl. No.: 265,877

[52] U.S. Cl............. 122/7 C, 110/7.5, 122/DIG. 2
[51] Int. Cl............................................. F22d 1/00
[58] Field of Search...................... 122/7 C, DIG. 2; 110/7 R, 7.5

[56] References Cited
UNITED STATES PATENTS
2,406,581 8/1946 Bergstrom et al. ................. 110/7.5
3,170,442 2/1965 Hochmuth ......................... 122/7 C
3,703,919 11/1972 Owens et al. ...................... 122/7 C

*Primary Examiner*—Carroll B. Dority, Jr.
*Assistant Examiner*—Harold Joyce
*Attorney*—Eldon H. Luther et al.

[57] ABSTRACT

A chemical recovery unit in which black liquor from a pulping process is burned including a direct contact evaporator for concentrating the black liquor prior to its introduction into a furnace. Low pressure superheated steam is used as the heating medium in the direct contact evaporator, and also in a first air preheater supplying primary combustion air to the furnace. Moisture evaporated from the black liquor in the evaporator, and also steam leaving the first air preheater, is used to preheat secondary combustion air for the furnace.

2 Claims, 1 Drawing Figure

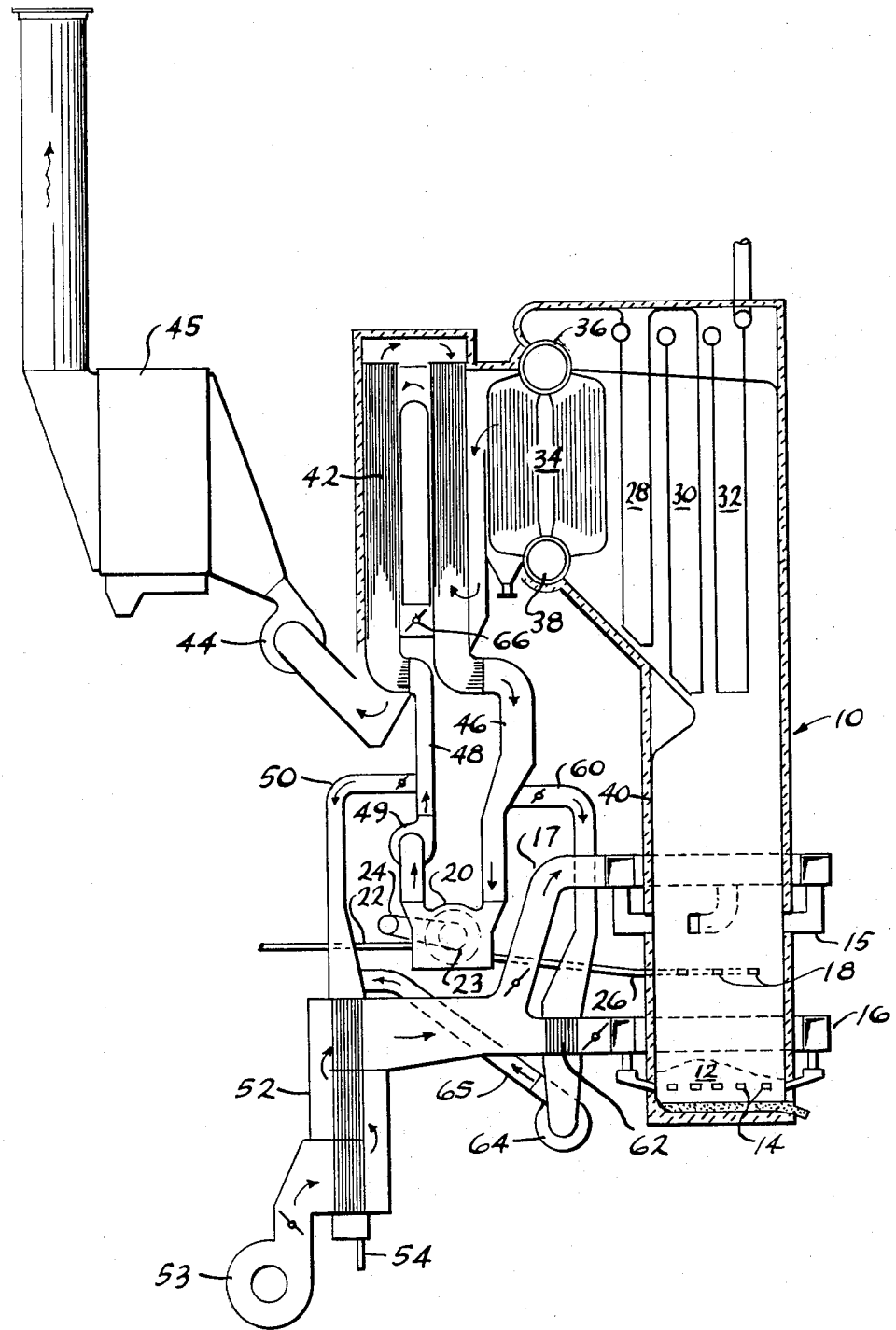

AIR POLLUTION CONTROL SYSTEM FOR CHEMICAL RECOVERY UNIT

BACKGROUND OF THE INVENTION

In burning black liquor in chemical recovery furnaces, it is desirable to maintain the solids content of the black liquor within the range of 65-70 percent in order to make it more easily burned and to better complete the oxidation of malodorous sulphur compounds to further their conversion to recoverable salts. Many methods of concentrating the black liquor prior to its introduction into the furnace have been used in the past. One method has been to use the combustion gases exiting from the furnace in a direct contact evaporation unit. However, this method permits the carbon dioxide in the combustion gases to react with sodium sulphide and other organic sulphur compounds in the black liquor. These reactions produce malodorous sulphur gases such as hydrogen sulphide, dimethyl sulphide, methyl mercaptan, etc. Air pollution restrictions will virtually prohibit future use of direct contact evaporators for this purpose.

Indirect contact evaporators are at present the only other significant means of concentrating black liquor, but their practical limit at present is about 63 percent solids. This limit is caused by scale forming on the heating surfaces as moisture is evaporated at the high temperature surface.

This invention proposes to continue to use a direct contact evaporator, such as the cascade type, which does not have the scaling problem, and also proposes the use of superheated steam in place of the combustion gases to provide heat for the evaporation of water from the black liquor. This will eliminate any contact between the combustion gases and the black liquor and therefore eliminate that source of odor while still permitting concentration of the black liquor to 68 percent solids or higher, if desired.

In burning black liquor it is also desirable to obtain as high a heat recovery as possible in the form of high pressure steam generated in the boiler. This is expressed as efficiency. Lower combustion gas losses result in higher efficiencies. One of the greatest losses is in the latent heat of water vapor in the combustion gases exiting to the atmosphere. If black liquor is burned at 68 percent solids, the combustion gases will have a high latent heat loss but if burned at only 63 percent solids, the latent heat loss will be much higher. Furthermore, the additional moisture requires a larger furnace, boiler, economizer, precipitator ducts, fan and chimney to handle it as a vapor.

It is also advantageous to have the primary combustion air entering the furnace at a relatively high temperature. This prevents combustion instability and also prevents the release of sulphur dioxide to the stack.

SUMMARY OF THE INVENTION

The chemical recovery unit of the invention uses a direct contact evaporator for concentrating the black liquor prior to its introduction into the furnace. Low pressure superheated steam is used as the heating medium in the evaporator, and is also used to preheat the primary combustion air. Moisture evaporated from the black liquor in the evaporator, and also steam leaving the primary combustion air preheater, is used to preheat the secondary combustion air.

BRIEF DESCRIPTION OF THE DRAWING

The FIGURE is a partial sectional side view of a chemical recovery unit incorporating the invention.

DESCRIPTION OF THE PREFERRED EMBODIMENT

Referring to the FIGURE, 10 denotes a recovery furnace having a hearth, or smelting zone 12. Black liquor, evaporated to the desired density, is introduced into the furnace by nozzles 18. The primary air for combustion is supplied by means of duct 16 and air nozzles 14. Secondary combustion air is supplied by duct 17 and end nozzles 15. The black liquor supplied to the furnace is evaporated prior to its introduction thereinto, so as to increase its solids content to a desired percentage, in cascade evaporator 20. The black liquor is introduced into the evaporator by means of inlet 22 and leaves therefrom through outlet pipe 26. Contained within the evaporator is a rotating drum 23 driven by means of motor 24. This drum consists of a pair of end plates having a plurality of rods secured therebetween. In rotating, the rods pick up black liquor from the pool contained in the lower portion of the housing, thus exposing it to the superheated steam flowing through the upper portion of the housing.

The hot combustion gases generated by the burning of black liquor within the furnace pass into the upper portion of the furnace, flowing over superheater tubes 28, 30 and 32. Also positioned in the upper portion of the furnace is boiler section 34 having an upper steam and water drum 36 and a lower water drum 38, with steam generating tubes extending therebetween. Lower drum 38 also supplies water to tubes 40, which line the walls of the furnace. Downstream of the boiler section 34 is a low pressure superheater section 42. After passing over all of the heat exchange surface, the combustion gases are exhausted to atmosphere through fan 44. An electrostatic precipitator 45 removes impurities from the exhausted gases.

Connected to an outlet header of low pressure superheater 42 is a duct 46 leading downwardly to the cascade evaporator 20. The steam passes through the upper portion of the evaporator housing before cycling back to an inlet header of superheater 42 by way of duct 48. Fan 49 maintains circulation of steam to and from the cascade evaporator. The superheated steam in passing over the black liquor coated rods of the drum causes evaporation of water from the black liquor.

The water vapor obtained from the black liquor is bled off from the loop between the superheater 42 and cascade evaporator 20 through duct 50. This duct conveys the superheated steam to an air preheater 52. Condensate is removed from the air preheater by means of discharge line 54. A damper valve in duct 50 can be set to allow the proper amount of bleed off so as to maintain a substantially constant quantity of steam circulating back to superheater 42 at all times.

The low pressure superheater 42, in addition to supplying steam to evaporator 20, supplies heating steam through duct 60 to the high temperature primary air preheater 62, located in duct 16. The steam after giving up heat in air preheater 62 flows by way of fan 64 and duct 65 to join the steam flowing to the low temperature air preheater 52.

A duct 66 bypasses the low temperature superheater 42. When the chemical recovery unit is operating at low loads, the damper in duct 66 can be slightly opened, allowing combustion gases to bypass the superheater 42. This allows the temperature of the gases flowing to the precipitator to be increased to prevent corrosion, condensation and arcing of the precipitator which might occur on low load operation because of lower gas temperatures. Dampers in the various ducts can be used to control flow to the various structures, as desired.

The operation of the system will now be described. Black liquor is burned in the furnace 10. The hot combustion gases give up heat to generate steam in the furnace wall tubes 40 and the boiler tubes, which steam is superheated in superheater 28, 30 and 32. This steam is used for power generation and operating auxiliary equipment of the plant. The combustion gases in passing through low pressure superheater 42 are reduced to a low temperature before being exhausted to the atmosphere. Since these combustion gases do not come in contact with the black liquor, they do not change to malodorous gases and they do not pick up additional water vapor.

Some of the superheated steam passes through evaporator 20, where moisture is removed from the black liquor. In order to recover the latent heat of the superheated water vapor evaporated from the black liquor, it is passed through air heater 52. The heated air is used to support combustion of the black liquor in furnace 10. Another portion of the superheated steam from superheater 42 flows to the high temperature primary air preheater 62. The steam flowing from the superheater 42 to the cascade evaporator and air preheater can be on the order of 700°–800° F. The steam flowing from the cascade evaporator and from air preheater 62 can be approximately 300° F. The air leaving air preheater 52 can be 250°–300° F, and the air leaving preheater 62 can be on the order of 500°–600° F. This high temperature primary air gives good flame stability, and also cuts down on sulphur dioxide emissions to the stack.

From the above, it can be seen that the unit can be operated with high efficiency and minimum odor while preventing excessive moisture in the combustion gases being exhausted to atmosphere. This permits discharge of the combustion gases at the same temperature as other systems, but with less steam plume.

What is claimed is:

1. A chemical recovery unit comprising in combination a furnace including first superheat means associated with the furnace, second superheat means associated with the furnace, evaporation means for evaporating moisture from black liquor prior to its introduction into the furnace, a first air duct for conveying combustion air to the furnace to be used as secondary combustion air, a second air duct for conveying combustion air to the furnace to be used as primary air, first conveying means extending from the second superheat means to the evaporation means, second conveying means extending from the evaporation means to the second superheat means, first air preheater means located in the first air duct, second air preheater means located in the second air duct, third conveying means extending from the second conveying means to the first air preheater means, fourth conveying means extending from the first conveying means to the second air preheater means.

2. The chemical recovery unit set forth in claim 1, including fifth conveying means extending from the second air preheater means to the third conveying means.

* * * * *